United States Patent [19]

Maddock

[11] 4,342,450
[45] Aug. 3, 1982

[54] BAND SAW JIG

[76] Inventor: Thomas J. Maddock, 44561 McKenzie Hwy., Leaburg, Oreg. 97401

[21] Appl. No.: 150,999

[22] Filed: May 19, 1980

[51] Int. Cl.³ .............................................. B25B 1/00
[52] U.S. Cl. ...................... 269/87; 269/88; 269/221; 269/303; 269/909; 76/78 A
[58] Field of Search .................. 269/87, 88, 160, 221, 269/43, 296, 246, 265, 269, 257, 290, 293, 909, 303; 76/78 R, 78 A; 228/49 R, 49 C

[56] References Cited

U.S. PATENT DOCUMENTS

| | | | |
|---|---|---|---|
| 766,790 | 8/1904 | Richards | 269/303 |
| 1,672,808 | 6/1928 | Hansel | 269/221 X |
| 1,900,314 | 3/1933 | Strom | 269/87 X |

*Primary Examiner*—Robert C. Watson
*Attorney, Agent, or Firm*—James D. Givnan, Jr.

[57] ABSTRACT

A jig for placement in a vise and receiving the beveled ends of a band saw blade preparatory to the joining of same as by silver soldering. The jig includes a shouldered upper edge which serves to align the blade end segments. A clamping member includes foot portions for blade segment engagement. The clamping member and jig main body define open areas for blade access and which prevent heat conduction from the blade. Springs urge the clamping member to a blade releasing, raised position. Clips on the main body retain the blade in place on a curved bottom wall of the main body to facilitate a filing operation removing excess solder from the blade joint.

3 Claims, 3 Drawing Figures

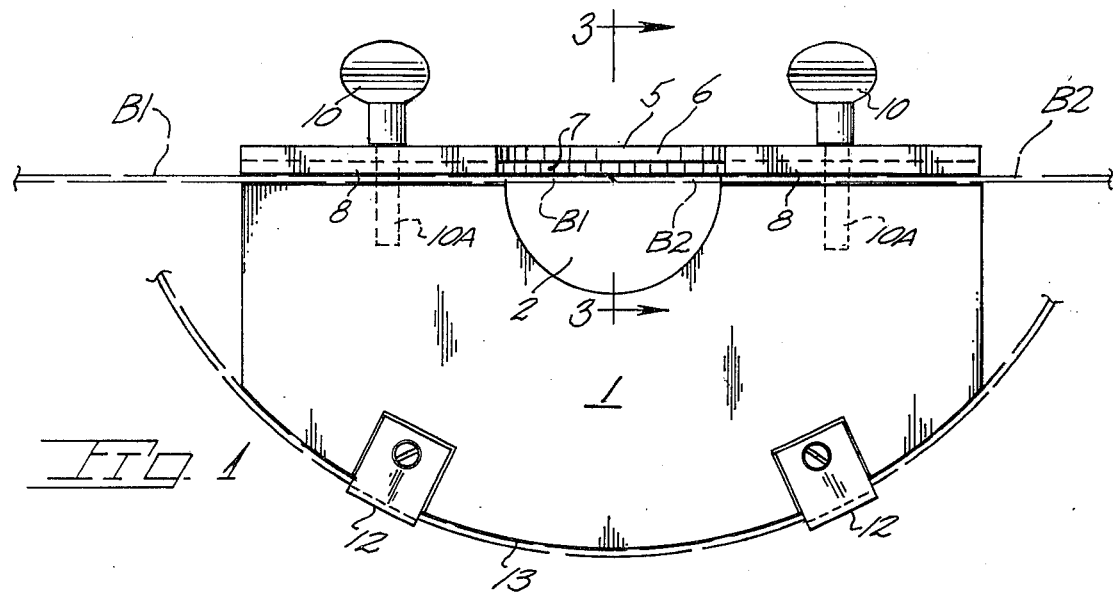
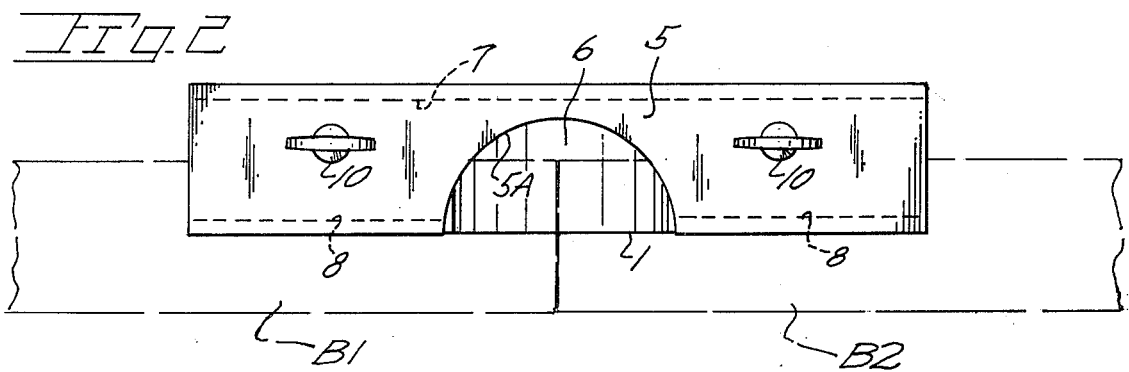
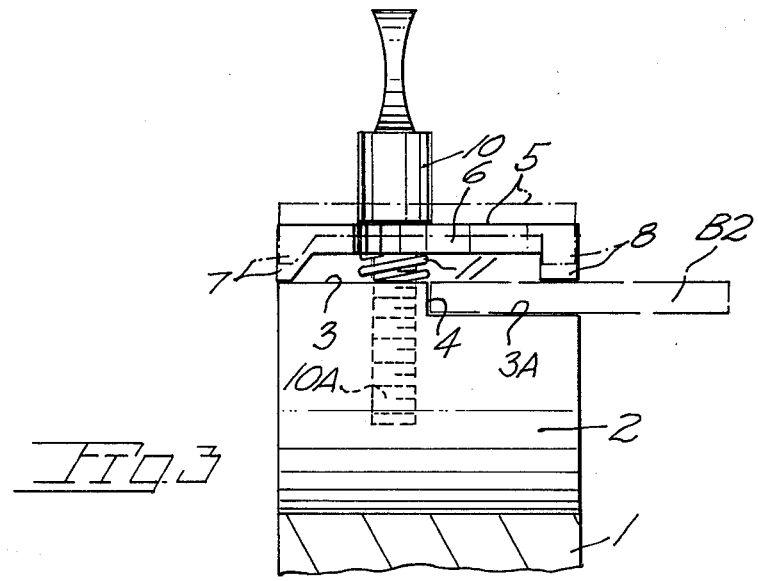

BAND SAW JIG

BACKGROUND OF THE INVENTION

The present invention pertains generally to a device for securing in place the prepared ends of a band saw blade preparatory to joining same.

Band saw blades consist of a closed loop of flexible narrow steel with one edge being a toothed or cutting edge. It is customary practice to have a band saw blade prepared at a saw shop, i.e., cut and end soldered to a specific length for later installation within a band saw. Such saw shops charge the blade buyer for the cutting and soldering operations, operations heretofore requiring expensive saw jigs and tools found only in saw shops.

The per foot cost of band saw blade material decreases with the greater the footage purchased. Accordingly, it is economically desirable for the band saw user to purchase band saw blade material at lengths exceeding what is normally required for a single band saw blade. This usually is not done, however, since most band saw users have no capability for cutting and soldering blade ends to provide a completed band saw blade. Only in sizable mill operations is the cost of conventional blade cutting and soldering equipment justified.

SUMMARY OF THE PRESENT INVENTION

The present invention is embodied within a band saw blade holding jig which locates and grips opposed end segments of a blade enabling joining of same and other blade finishing operations.

The present band saw blade jig includes a main body which may be conveniently held in place within a vise during use. A clamping member of the jig is adapted to bear upon said main body and upon opposed end segments of the blade. The uppermost surface of said body is shouldered to properly align the blade end segments. The clamping member and body are relieved at the juncture of the blade ends to permit blade access during soldering. Screw means permit manual tightening of the clamping member onto the blade segments while resilient means automatically upwardly repositions the clamping member to facilitate blade installation and removal.

Important objectives of the present blade jig include the provision of a jig for precisely locating the prepared ends of a band saw blade to retain the ends in place during the application of silver solder; the provision of a blade jig of simple construction and, hence, having a low manufacturing cost, permitting practical use of the jig in the smallest of band saw operations with consequent savings to the operator as he may form his own blades from a supply of blade stock; the provision of a band saw blade jig having a body and a clamping member both having relieved areas thereon providing access to the upper side of the blade end segments; the provision of a band saw blade jig having a clamping member resiliently biased upwardly to a blade releasing position; the provision of a band saw blade jig providing a curved surface with blade retention means thereon facilitating the filing of the silver soldered blade joint.

BRIEF DESCRIPTION OF THE DRAWING

In the accompanying drawing:

FIG. 1 is a front elevational view of the present band saw blade repair jig with a band saw segment in dash lines in place thereon;

FIG. 2 is a plan view of FIG. 1; and

FIG. 3 is a vertical sectional view taken along line 3—3 of FIG. 1.

DETAILED DESCRIPTION OF THE PREFERRED EMBODIMENT

With continuing attention to the drawing wherein applied reference numerals indicate parts similarly hereinafter identified, the reference numeral 1 indicates a main body of the jig formed from a solid block of metal and being of suitable size and shape to enable securement within a work table mounted vise.

Centrally located within main body 1 is a recess 2 which bifurcates the upper surface 3 of said main body to avoid heat transfer from the blade ends. The bifurcated upper surface 3 is shouldered at 4 to provide a recessed surface 3A for band saw blade segment reception. The shoulders 4 on the bifurcated upper surface of body 1 serve to locate and align the shoulder abutting end segments B1 and B2 of a band saw blade and assure precise alignment of same. Said end segments are beveled along their ends prior to such positioning.

A clamping member at 5, as viewed in FIG. 2, is centrally relieved at 5A to provide a centrally located open area 6 permitting full access to the upper surface of the abutted blade ends to be joined. As best viewed in FIG. 3, clamping member 5 includes foot portions 7 and 8 formed along the continuous rearward edge and the bifurcated forward edge of said clamping member. Additionally, the clamping member is apertured to receive a pair of thumb screws 10 which bear upon, when tightened, the upper surface of clamping member 5 to urge feet 7 and 8 into biased contact with the main body and with the blade segements respectively.

Thumb screws 10 include a threaded segment 10A received within an internally threaded bore formed within main body 1. Springs at 11 bias clamping member 5 upwardly upon backing off of thumb screws 10 during blade removal. The installation of blade end segments to be soldered is facilitated by clamping member 5 being held in a raised position by springs 11.

Clips at 12 are mounted to the bottom wall 13 of the blade body 1 and provide blade receiving spaces for the reception of a sidewise inserted soldered band saw blade.

Filing of the soldered surfaces of the blade is greatly facilitated by such blade placement after completion of the soldering operation. Filing of a soldered band saw blade is, of course, accomplished with main body 1 inverted from the position shown in FIG. 1.

In a typical blade, fabrication is accomplished by inserting the previously beveled blade ends into abutting placement on a jig secured within a vise. With both blade segments firmly against shoulder 4, silver solder is applied to the abutted blade ends subsequent to heating of same. After the upper surface of the joint is soldered, the joined blade segments are removed and reinstalled within clips 12 for filing off of excess solder. After completion of the soldering, filing of the newly soldered surface is accomplished as above described by temporary blade retention within clips 12.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

1. A band saw soldering jig for retention in a vise and comprising in combination, a main body having an irregular upper surface to provide an abutment therealong against which end segments of a band saw blade may be placed in an aligned manner preparatory to soldering of same to one another, said main body defining a centrally located recess so as to avoid contact with the blade ends being soldered to avoid resultant heat loss therefrom by conduction, a clamping member in place above said upper surface of said main body, adjustable means engaged with said main body for urging said clamping member into engagement with the end segments of the blade to lock same in place against the irregular upper surface of said main body, and said clamping member defining an open area permitting access to the blade end segments clamped thereby for purposes of facilitating soldering of same.

2. The band saw repair jig claimed in claim 1 wherein said clamping member has depending feet engageable with the upper surface of said main body and with the blade segments in place thereon.

3. The band saw repair jig claimed in claim 1 wherein said main body has a curved bottom wall on which a previously soldered blade may be placed for purposes of filing the soldered area of same, clips on said main body bottom wall to retain the soldered blade in place during filing.

* * * * *